4763X
R. SWEENY.
Plow.
Patented May 18, 1827.
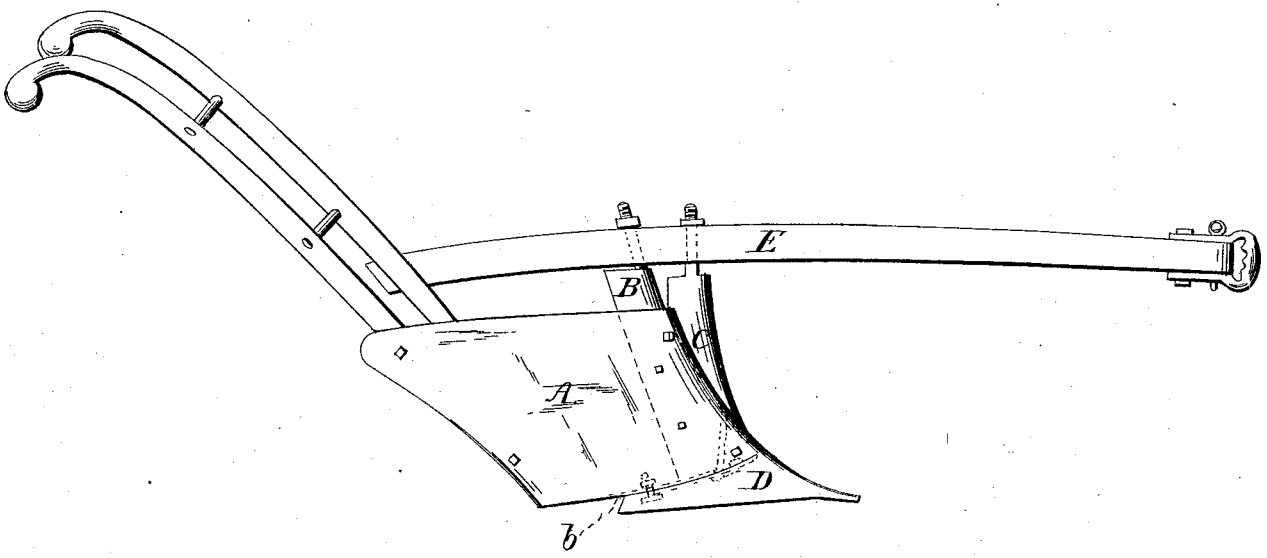
N. PETERS, PHOTO-LITHOGRAPHER, WASHINGTON, D. C.

4763X

UNITED STATES PATENT OFFICE.

ROBERT SWEENY, OF WARREN COUNTY, OHIO.

IMPROVEMENT IN PLOWS.

Specification forming part of Letters Patent dated May 18, 1827.

*To all whom it may concern:*

Be it known that I, ROBERT SWEENY, of Warren county, Ohio, have invented an Improvement in Cast-Iron Plows, of which the following is a specification.

"Sweeny's Ohio Plow" is constructed in the manner following, to wit:

The mold being of cast-iron, with a square shoulder to rest on the sheth, with two square countersunk holes, through which screws are placed, the one fastening the mold to the sheth and the other fastening the share to the mold. On the hinder part of said mold there is a limb projecting from the inside, through which a screw also passes to the share, making fast the hinder part of said mold to the hinder part of said share. There are also two holes through the mold, through which rivets are placed, fastening said mold to the sheth. There are also two other holes through which rivets are placed, fastening said mold to the right-hand handle of said plow.

The share is made of wrought-iron, a wrought landside, with steel on the heel and edge, and also a steel point extending back, covering the point of the mold to prevent roots, &c., from lodging under said mold. There are also two holes in the share—one before and the other back—to receive the screws from the mold aforesaid.

The cutter of said plow is made of wrought-iron, with a steel edge setting closely to the mold, behind a small shoulder on said mold, within half an inch of its point, and made fast to the share by a hook welded on its inside, the upper end of which penetrates the beam and is made fast by a screw on top. There is, furthermore, an iron bolt passing through the beam and sheth, bracing the whole together.

The beam, handles, and sheth of said plow are constructed similar to those of other plows now in use, the improvement here claimed, as aforesaid, differing from other plows now in use, particularly in the cutter, which is entirely new, the mold differing also from other plows now in use by having the screw behind, and in the sheth, before described, differing also in the manner in which it receives the cutter. The shape of the mold also differs from others in use, but which difference is indescribable.

ROBERT SWEENY.

Witnesses:
E. VANCE,
THORNTON CARNELL.